(12) United States Patent
Nakagawa

(10) Patent No.: US 7,300,097 B2
(45) Date of Patent: Nov. 27, 2007

(54) DOOR FOR VEHICLE

(75) Inventor: Hayami Nakagawa, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/720,288

(22) Filed: Nov. 25, 2003

(65) Prior Publication Data

US 2004/0104593 A1    Jun. 3, 2004

(30) Foreign Application Priority Data

Nov. 26, 2002    (JP)    ............ P 2002-341784

(51) Int. Cl.
*B60J 5/04*    (2006.01)
(52) U.S. Cl. .............. 296/146.6; 296/187.12; 49/502
(58) Field of Classification Search ............. 296/146.6, 296/187.12; 49/502
See application file for complete search history.

(56) References Cited

U.S. PATENT DOCUMENTS 5,536,060 A * 7/1996 Rashid et al. ............ 296/146.6
5,813,719 A * 9/1998 Kowalski ................. 296/146.6
6,039,387 A * 3/2000 Choi ..................... 296/187.12
6,231,112 B1   5/2001 Fukumoto et al.
6,782,663 B1* 8/2004 Chauvin ..................... 49/502
2004/0113455 A1* 6/2004 Schmidt ................. 296/146.6

FOREIGN PATENT DOCUMENTS

| DE | 17 55 057 | 11/1971 |
|---|---|---|
| DE | 2426705 C2 | 12/1975 |
| DE | 195 29 088 A1 | 2/1997 |
| DE | 198 01 842 A1 | 7/1999 |
| DE | 100 60 632 A1 | 7/2002 |
| JP | 2001-328430 A | 11/2001 |

* cited by examiner

*Primary Examiner*—Stephen Gordon
(74) *Attorney, Agent, or Firm*—Birch, Stewart, Kolasch & Birch, LLP

(57)    ABSTRACT

A door for a vehicle includes an outer panel for forming the contour of the door, a door reinforcement formed in a perimeter shape shaped in conformity with the contour of the door, and a substantially U-shaped inner panel that is upwardly open. Front and rear edges and lower edges of the door reinforcement and the inner panel are respectively connected to each other by welding to form a box-shaped section. Both ends of a side impact bar are welded or fused to front and rear vertical walls and of the door reinforcement, and a door hinge is attached to the vertical wall.

10 Claims, 4 Drawing Sheets

DOOR FOR VEHICLE

BACKGROUND OF THE INVENTION

Cross Reference to Related Application

This Nonprovisional application claims priority under 35 U.S.C. § 119(a) on Patent Application No(s). 2002-341784 filed in Japan on Nov. 26, 2002, the entire contents of which are hereby incorporated by reference.

1. Field of the Invention

The present invention relates to a side door in a vehicle, and more particularly to a structure of a side door that provides many advantages in its manufacture.

2. Description of the Related Art

As shown in FIG. 7, in a conventional side door 1 in a vehicle, an outer panel 2 and an inner panel 3 for respectively forming a contour of the door 1 are disposed in such a manner as to be spaced apart from each other in the transverse direction of the vehicle. Peripheral edges of the outer panel 2 and the inner panel 3 are connected to each other at such as vehicle front and rear sides and lower sides thereof. Further, reinforcing members such as a belt line reinforcement 4, a hinge reinforcement 5, and a latch reinforcement 6 are disposed between the outer panel 2 and the inner panel 3. A pair of side impact bars 9 are secured at their one ends to the hinge reinforcement 5 by means of a pair of front brackets 7, and are secured at their other ends to vehicle rear-side end portions of the inner panel 3 by means of a pair of rear brackets 8. The side impact bars 9 are arranged to enhance the rigidity of the door 1 as a whole and support an impact to which the door 1 is subjected during a collision of the vehicle.

However, in the case of such a structure, since the brackets and reinforcements are fabricated separately, the number of component parts increases. For this reason, when the individual brackets and reinforcements are manufactured, high manufacturing accuracy is required to ensure high accuracy of the shape and position after the assembly of the reinforcements. Further, attaching accuracy at the time when the brackets and reinforcements are attached to the door is also required. Accordingly, large numbers of manufacturing steps and operations are needed to satisfy these requirements. In addition, since the number of component parts increases, the man-hour of managing components also increases. Furthermore, since the respective reinforcing members are disposed on the inner panel 3 in a dispersed manner, the efficiency for securing the strength of the door is not good. Also, since joining portions necessary for attaching the brackets become dual structure, there has been a problem in that the weight of the door as a whole increases, and the cost required for manufacturing the door 1 increases.

As a door for a vehicle, a technique disclosed in JP-A-2001-328430 is conventionally known. In this conventional technique, a framework is disposed between a door inner cover and a door outer plate. However, the framework in this conventional technique has a triangular ring shape which is not affected by the shape of the door inner cover or the door outer plate. Accordingly, this framework does not adopt a structure conforming to the door shape in a lower portion of the door, so that it is not able to sufficiently reinforce the door as a whole.

SUMMARY OF THE INVENTION

It is an object of the present invention to provide a structure for reinforcing the door with high efficiency to increase the rigidity of the door for a vehicle and for reducing the manufacturing cost.

In a door for a vehicle in accordance with the invention, a door reinforcement is formed in a perimeter shape shaped in conformity with the contour of the door. This door reinforcement serves as reinforcing members such as a belt line reinforcement and a hinge reinforcement as well as brackets. Therefore, it is possible to reduce man-hour for preparing large kinds of reinforcing members such as the belt line reinforcement and the hinge reinforcement as well as brackets as in the conventional manner. As a result, it is possible to easily and substantially reduce the number of component parts. As the accuracy of the door reinforcement itself which is a single item component is enhanced, the accuracy of the respective portions of the door can be easily ensured, and man-hour for manufacturing the door can be reduced. In addition, since the door reinforcement is formed in a perimeter shape shaped in conformity with the door shape, the door reinforcement is able to reinforce the entire door, and the rigidity of the door can be enhanced easily. The perimeter shape may have a counter shaped almost like a polygon such as a substantially square.

DETAILED DESCRIPTION OF THE PREFERRED EMBODIMENTS

Embodiments of the present invention will be described with reference to the accompanying drawings.

Figure 1:
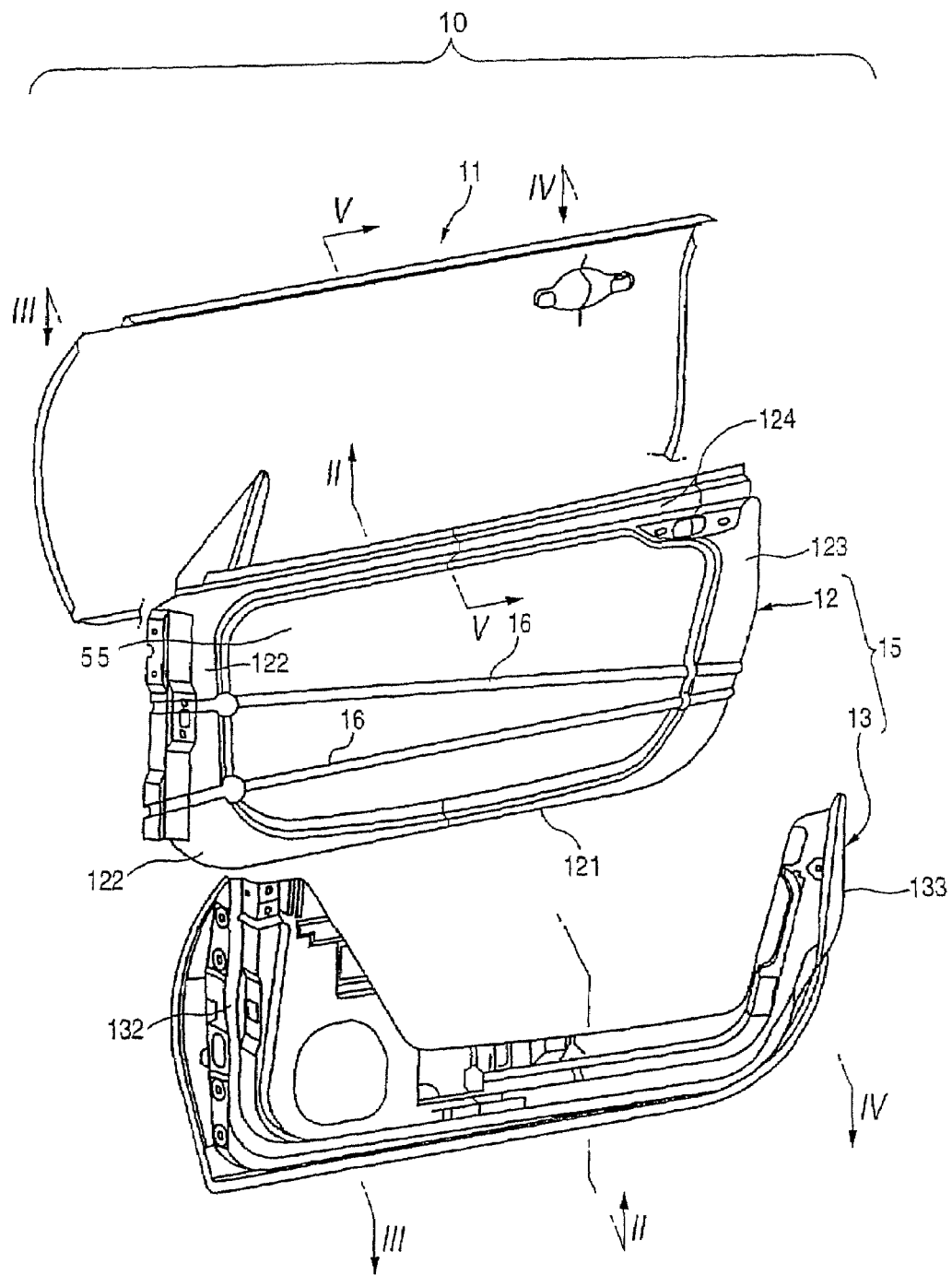
FIG. 1 is a schematic exploded perspective view showing an embodiment of the invention.

As shown in FIG. 1, a door 10 for a vehicle includes an outer panel 11 for forming the contour of the door 10, a door reinforcement 12 formed in a perimeter shape shaped in conformity with the contour of the door 10, and a substantially U-shaped inner panel 13 which is upwardly open. The perimeter shape of the door reinforcement 12 has a lower lateral wall 121, a front vertical wall 122, a rear vertical wall 123 and an upper lateral wall 124, each of which has an inner surface delineating and surrounding a substantially open inner area 55. The outer panel 11, the door reinforcement 12, and the inner panel 13 are arranged in that order from the vehicle compartment outer side.

Figure 2:
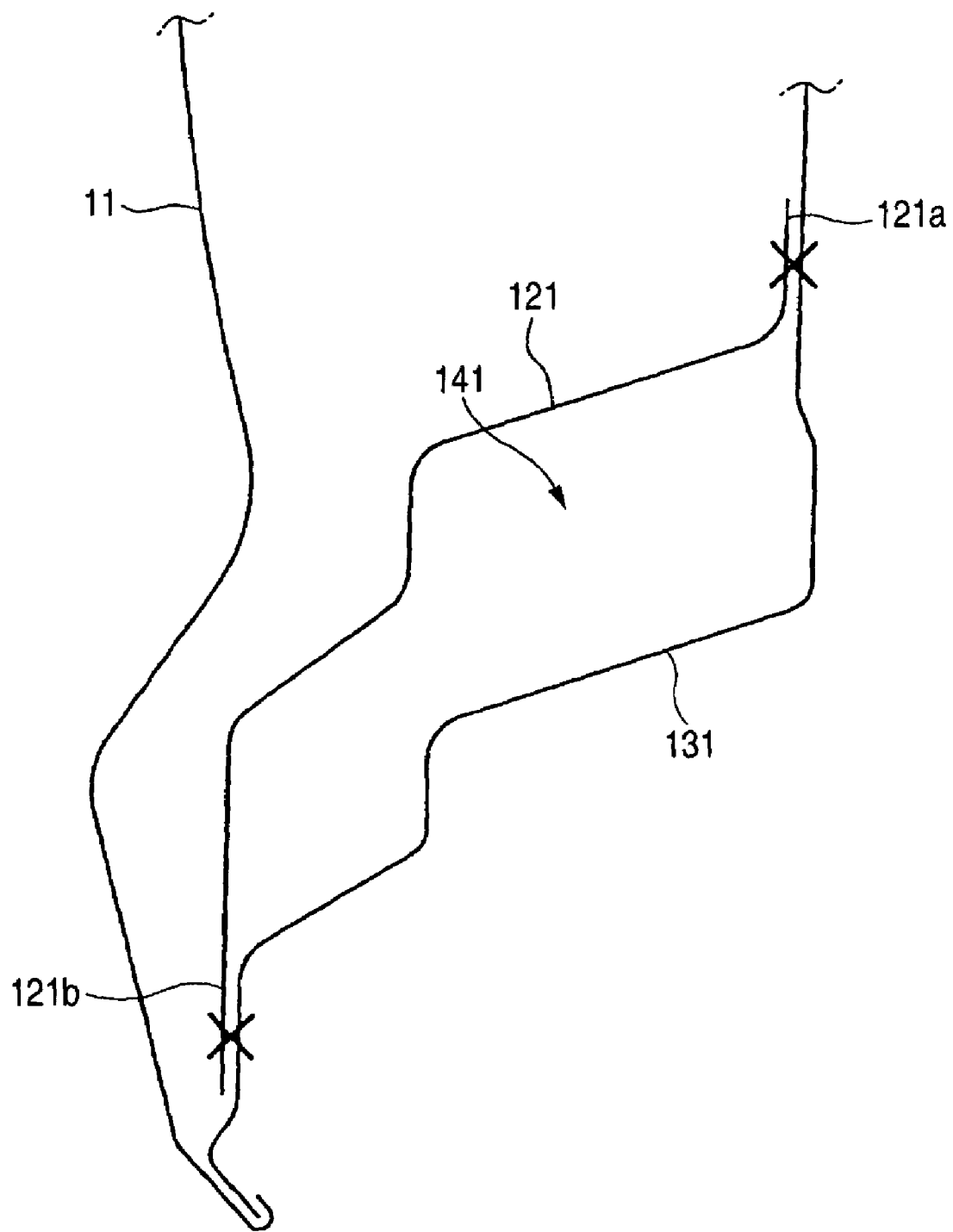
FIG. 2 is an enlarged vertical cross-sectional view taken along line II-II in FIG. 1.

As shown in FIG. 2, a lower lateral wall 121, which is a portion of the door reinforcement 12, is welded at its inner peripheral side edge 121a and its outer peripheral side edge 121b, respectively, to a lower end portion 131 of the inner panel. Consequently, a closed section 141 is formed as a box-shaped section by the lower lateral wall 121 of the door reinforcement and the lower end portion 131 of the inner panel.

The "box-shaped section" is not limited to a particular shape. It may include a contour shaped like a letter "C" or "U".

Figure 3:
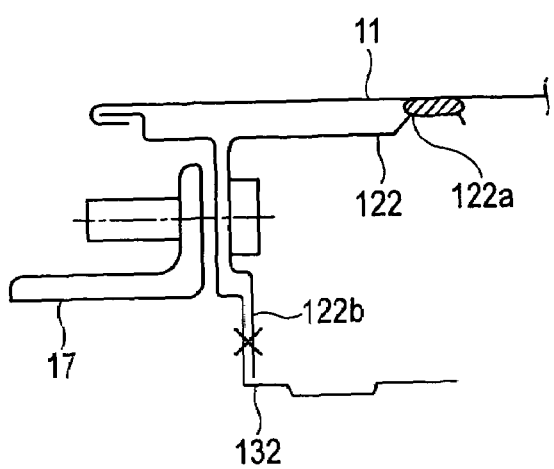
FIG. 3 is an enlarged vertical cross-sectional view taken along line III-III in FIG. 1.

As shown in FIG. 3, a front vertical wall 122, which is a portion of the door reinforcement 12, is welded at its inner peripheral side edge 122a to the outer panel 11, and is welded at its outer peripheral side edge 122b to a front end portion 132 of the inner panel 13. As a result, a box-shaped section is formed by the front vertical wall 122 of the door reinforcement and the front end portion 132 of the inner panel.

Figure 4:
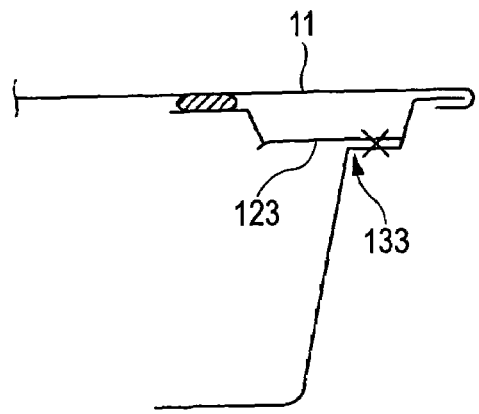
FIG. 4 is an enlarged vertical cross-sectional view taken along line IV-IV in FIG. 1.

Further, as shown in FIG. 4, a rear vertical wall 123, which is a portion of the door reinforcement 12, is welded in a superposed manner to a rear end portion 133 of the inner panel.

Figure 5:
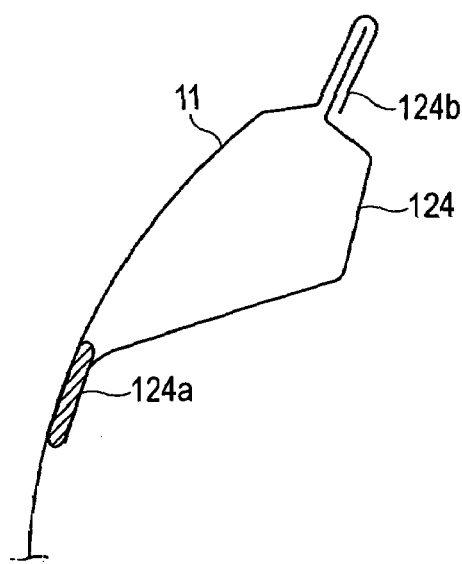
FIG. 5 is an enlarged vertical cross-sectional view taken along line V-V in FIG. 1.
Figure 6:
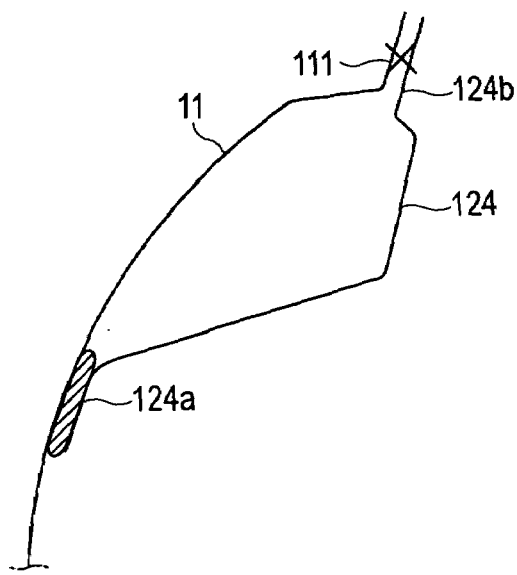
FIG. 6 is a diagram illustrating a modification of the embodiment shown in FIG. 5.
Figure 7:
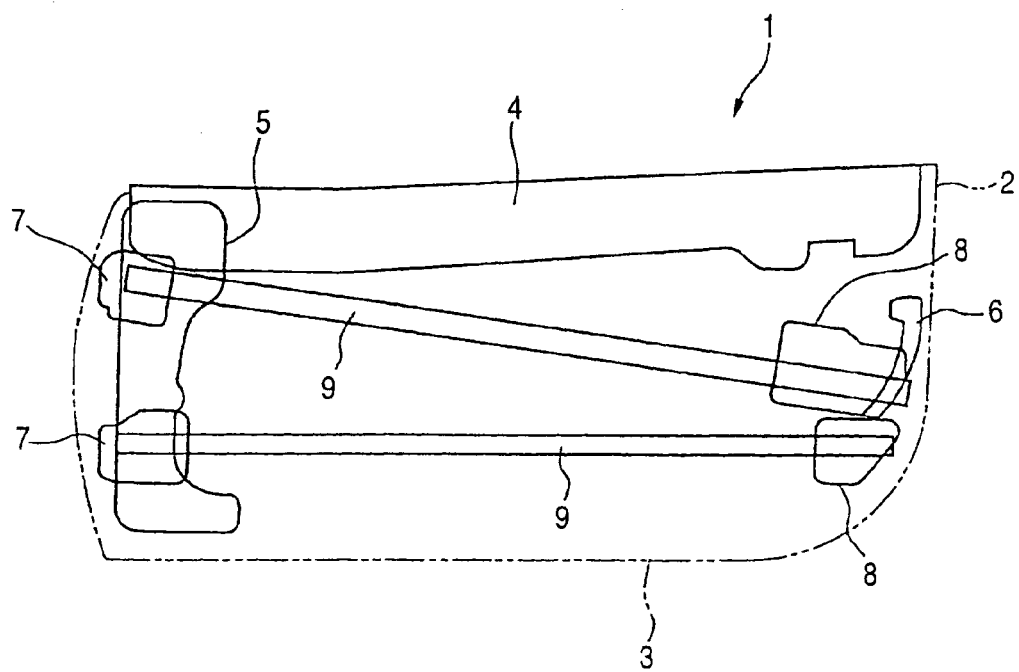
FIG. 7 is a schematic side perspective view of a conventional door.

As shown in FIG. 5, an outer peripheral side edge 124b of an upper lateral wall 124, which is a portion of the door reinforcement 12, is fixed to an upper end portion 111 of the outer panel by hemming. Further, an inner peripheral side edge 124a of the upper lateral wall 124 is bonded to the outer panel 11. Furthermore, as shown in FIG. 6, the outer peripheral side edge 124b of the upper lateral wall 124, which is a portion of the door reinforcement 12, may be welded to the upper end portion 111 of the outer panel.

Thus, the door reinforcement 12 forms at its lower lateral wall 121 a cross section in cooperation with the inner panel 13, and forms at its front vertical wall 122 and its rear vertical wall 123 respectively a box-shaped section which is open to the inner peripheral side. Furthermore, the door reinforcement 12 forms at its upper lateral wall 124 a closed section in cooperation with the outer panel 11.

In this manner, a framework 15 of the door 10 is formed by the door reinforcement 12 and the inner panel 13.

In addition, the space which is defined in the transverse direction of the vehicle between the upper lateral wall 124 and the inner panel 13 is used as a space for inserting or accommodating a door window and a window regulator module which are not shown. Vehicle longitudinal-direction edges (front and rear edges) and upper and lower edges of the outer panel 11 are respectively fixed to outer peripheral edges of the framework 15 by hemming.

Further, both ends of each of a pair of side impact bars 16 are welded or fused to the vehicle front vertical wall 122 and the vehicle rear vertical wall 123 of the door reinforcement 12, respectively. A door hinge 17 is attached to the vehicle front vertical wall 122, and an unillustrated door latch is attached to the vehicle rear vertical wall 123.

The door structure having such a construction provides the following advantages.

First, the door reinforcement 12 has a door reinforcing function which is conventionally performed by such as a belt line reinforcement 4 and a hinge reinforcement Further, both vertical walls 122 and 123 of the door reinforcement 12 respectively fix both ends of the side impact bars 16. Consequently, in comparison with the conventional structure, it is possible to substantially reduce the number of various reinforcement parts necessary for reinforcing the door 10. Further, since the reinforcement consists of only the door reinforcement 12, if the manufacturing accuracy of the door reinforcement 12 itself is made accurate, the attaching accuracy of such as the door hinge and the side impact bars 16 which are attached to this door reinforcement is naturally enhanced. Also, the reduction in the number of component parts makes it possible to substantially reduce man-hour for managing components, so that it is possible to easily reduce man-hour required for manufacturing the door 10.

In addition, since the door reinforcement 12 is formed in the perimeter shape, the load applied to the door reinforcement 12 can be distributed uniformly to the entire door reinforcement 12, thereby making it possible to efficiently support the load. For this reason, it is possible to easily enhance the rigidity of the door reinforcement 12, making it possible to reliably increase the strength as the door framework 15. Further, since the door reinforcement 12 is formed in conformity with the door shape, the entire door can be reinforced and supported. Since the outer panel 11 is not formed as a framework member but is made to function as a mere decorative panel, the degree of freedom of the shape of the outer panel increases, and its design feature improves.

Since it is possible to omit joining portions of the dual structure conventionally required for attaching brackets and the like, it becomes possible to lower the weight of the door 10 as a whole.

Furthermore, the inner panel 13 has a substantially U-shaped configuration which is upwardly open wide, and if comparison is made with the conventional case where the inner panel forms the contour of the door, the weight can be easily lowered. In this aspect as well, it becomes possible to attain a reduction in the weight of the door 10 as a whole.

Namely, there is a large advantage in that the cost necessary for manufacturing the door 10 can be easily lowered by virtue of the reduction in the number of component parts and man-hour for managing components, improvement in the parts attaching accuracy, the increase in the strength of the door framework 15, the lowering of the weight, and the like.

Although in the above-described embodiment the door reinforcement 12 completely integrates the conventional hinge reinforcement, a separate hinge washer maybe secured to the vehicle front vertical wall 122 of the door reinforcement 12 in view of molding the door reinforcement 12. Even in this case, an operational effect similar to that of the above-described embodiment can be obtained In the door for a vehicle according to the invention, the door reinforcement is formed in a perimeter shape shaped in conformity with the contour of the door, and it is unnecessary to separately prepare reinforcing members and brackets in large numbers as in the conventional manner. Therefore, it is possible to easily and substantially reduce the number of component parts. In addition, the man-hour required for manufacturing the door can be reduced by simply ensuring the parts accuracy of the door. At the same time, since the rigidity of the door reinforcement can be easily enhanced, there is a large advantage in that it is possible to lower the manufacturing cost of the door.

What is claimed is:

1. A door for a vehicle comprising:
   a door reinforcement formed in a perimeter shape shaped substantially in conformity with a contour of the door, the door reinforcement having a lower lateral wall, a front vertical wall, a rear vertical wall and an upper lateral wall, each of which has an inner surface delineating and surrounding a substantially open inner area;
   a side impact bar traversing the open inner area and secured to the front vertical wall and the rear vertical wall;
   an inner panel disposed on a vehicle compartment inner side of the door reinforcement, vehicle longitudinal-direction edges and lower edge of the inner panel being connected to the door reinforcement to form a box-shaped section between the inner panel and the door reinforcement; and an outer panel disposed on a vehicle compartment outer side of the door reinforcement, vehicle longitudinal-direction edges and upper and lower edges of the outer panel being connected to the door reinforcement or to the inner panel.

2. The door for a vehicle according to claim 1, wherein at least a portion of a box-shaped section is provided with a closed sectional shape by welding an inner peripheral side and an outer peripheral side of the door reinforcement to the inner panel.

3. The door for a vehicle according to claim 1, wherein a closed section is formed by the upper lateral wall of the door reinforcement and the outer panel.

4. A door for a vehicle comprising:
a door reinforcement formed in a perimeter shape shaped substantially in conformity with a contour of the door, an inner panel disposed on a vehicle compartment inner side of the door reinforcement, vehicle longitudinal-direction edges and lower edge of the inner panel being connected to the door reinforcement to form a box-shaped section between the inner panel and the door reinforcement; and
an outer panel disposed on a vehicle compartment outer side of the door reinforcement, vehicle longitudinal-direction edges and upper and lower edges of the outer panel being connected to the door reinforcement or to the inner panel, wherein
a closed section is formed by an upper lateral wall of the door reinforcement and the outer panel, and
an upper edge of the upper lateral wall is fixed to the outer panel by hemming, and a lower edge of the upper lateral wall is bonded to the outer panel, to form the closed section.

5. The door for a vehicle according to claim 3, wherein an upper edge of the upper lateral wall is welded to the outer panel, and a lower edge of the upper lateral wall is bonded to the outer panel, to form the closed section.

6. The door for a vehicle according to claim 3, wherein the upper lateral wall and the inner panel are disposed in such a manner as to be spaced apart from each other.

7. The door for a vehicle according to claim 6, wherein the inner panel has a substantially U-shaped configuration which is upwardly open.

8. A door for a vehicle comprising:
a door reinforcement formed in a perimeter shape shaped substantially in conformity with a contour of the door;
an inner panel disposed on a vehicle compartment inner side of the door reinforcement, vehicle longitudinal-direction edges and lower edge of the inner panel being connected to the door reinforcement to form a box-shaped section between the inner panel and the door reinforcement; and
an outer panel disposed on a vehicle compartment outer side of the door reinforcement, vehicle longitudinal-direction edges and upper and lower edges of the outer panel being connected to the door reinforcement or to the inner panel
wherein the vehicle longitudinal-direction edges of the outer panel and the lower edge of the outer panel are connected to the inner panel by hemming.

9. A door for a vehicle comprising:
a door reinforcement formed in a perimeter shape shaped substantially in conformity with a contour of the door;
an inner panel disposed on a vehicle compartment inner side of the door reinforcement, vehicle longitudinal-direction edges and lower edge of the inner panel being connected to the door reinforcement to form a box-shaped section between the inner panel and the door reinforcement; and
an outer panel disposed on a vehicle compartment outer side of the door reinforcement, vehicle longitudinal-direction edges and upper and lower edges of the outer panel being connected to the door reinforcement or to the inner panel
wherein both ends of a side impact bar for protecting a passenger from a lateral collision are secured to a vehicle front vertical wall and a vehicle rear vertical wall of the door reinforcement.

10. The door for a vehicle according to claim 1 wherein the inner panel has a substantially U-shape which has an uninterrupted upwardly open portion.

* * * * *